United States Patent
Rupavatharam

(10) Patent No.: US 10,474,518 B1
(45) Date of Patent: Nov. 12, 2019

(54) OBTAINING HISTORICAL INFORMATION IN A DEVICE CORE DUMP

(71) Applicant: Juniper Networks, Inc., Sunnyvale, CA (US)

(72) Inventor: Sreekanth Rupavatharam, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 384 days.

(21) Appl. No.: 15/370,369

(22) Filed: Dec. 6, 2016

(51) Int. Cl.
*G06F 11/00* (2006.01)
*G06F 11/07* (2006.01)
*G06F 11/36* (2006.01)

(52) U.S. Cl.
CPC ........ *G06F 11/0778* (2013.01); *G06F 11/366* (2013.01)

(58) Field of Classification Search
CPC .. G06F 2212/684; G06F 12/145; G06F 12/11; G06F 12/1036; G06F 12/1012; G06F 11/3476; G06F 11/348
See application file for complete search history.

(56) References Cited

U.S. PATENT DOCUMENTS

| | | | | |
|---|---|---|---|---|
| 5,245,274 A * | 9/1993 | Youngquist | .............. | G01W 1/16 324/202 |
| 8,239,167 B2 * | 8/2012 | Ramacher | ........... | G06F 11/0748 702/183 |
| 2002/0120815 A1 * | 8/2002 | Zahavi | ................ | G06F 11/3034 711/118 |
| 2003/0014322 A1 * | 1/2003 | Kreidler | ............. | G06Q 10/0637 705/7.36 |
| 2003/0014387 A1 * | 1/2003 | Kreidler | ............. | G05B 19/4183 |
| 2004/0103175 A1 * | 5/2004 | Rothman | ................ | H04L 67/34 709/222 |
| 2004/0268359 A1 * | 12/2004 | Hanes | ..................... | G06F 9/545 719/310 |
| 2005/0273672 A1 * | 12/2005 | Konda | ................ | G06F 11/3636 714/45 |
| 2007/0207800 A1 * | 9/2007 | Daley | ................. | H04L 41/0803 455/425 |
| 2008/0077780 A1 * | 3/2008 | Zingher | ............. | G06F 11/3636 712/227 |

(Continued)

OTHER PUBLICATIONS

Wikipedia, "Core dump," https://en.wikipedia.org/wiki/Core_dump, Nov. 1, 2016, 5 pages.

(Continued)

*Primary Examiner* — Bryce P Bonzo
*Assistant Examiner* — Jeison C Arcos
(74) *Attorney, Agent, or Firm* — Harrity & Harrity, LLP

(57) ABSTRACT

A device may receive information related to an operation of the device during each of multiple time intervals. The device may store, for each time interval of the multiple time intervals, the information in a respective slot of a circular buffer that includes multiple slots. The circular buffer may be used to store a historical record of the information in one or more of the multiple slots. The historical record may be provided from the circular buffer during a dump of the device. The device may provide the historical record during the dump of the device based on storing the historical record of the information in the one or more of the multiple slots.

20 Claims, 4 Drawing Sheets

(56) References Cited

U.S. PATENT DOCUMENTS

| | | | | |
|---|---|---|---|---|
| 2008/0222612 A1* | 9/2008 | Glotzbach | ............ | G06F 11/364 |
| | | | | 717/127 |
| 2008/0295077 A1* | 11/2008 | Sengupta | ............ | G06F 11/0748 |
| | | | | 717/124 |
| 2009/0063651 A1* | 3/2009 | Brahmavar | ......... | G06F 11/0709 |
| | | | | 709/212 |
| 2009/0106278 A1* | 4/2009 | Ramacher | ............ | G06F 11/0748 |
| 2011/0078520 A1* | 3/2011 | Nakai | ................ | G06F 11/0778 |
| | | | | 714/57 |
| 2013/0042154 A1* | 2/2013 | Agarwal | ............ | G06F 11/3612 |
| | | | | 714/38.14 |
| 2018/0225063 A1* | 8/2018 | Singhvi | ................ | G06F 3/0656 |

OTHER PUBLICATIONS

Wikipedia, "Kernel (operating system)," https://en.wikipedia.org/wiki/Kernel_(operating_system), Dec. 4, 2016, 18 pages.
Wikipedia, "Loadable kernel module," https://en.wikipedia.org/wiki/Loadable_kernel_module, Nov. 10, 2016, 5 pages.
Wikipedia, "Circular buffer," https://en.wikipedia.org/wiki/Circular_buffer, Sep. 11, 2016, 4 pages.

\* cited by examiner

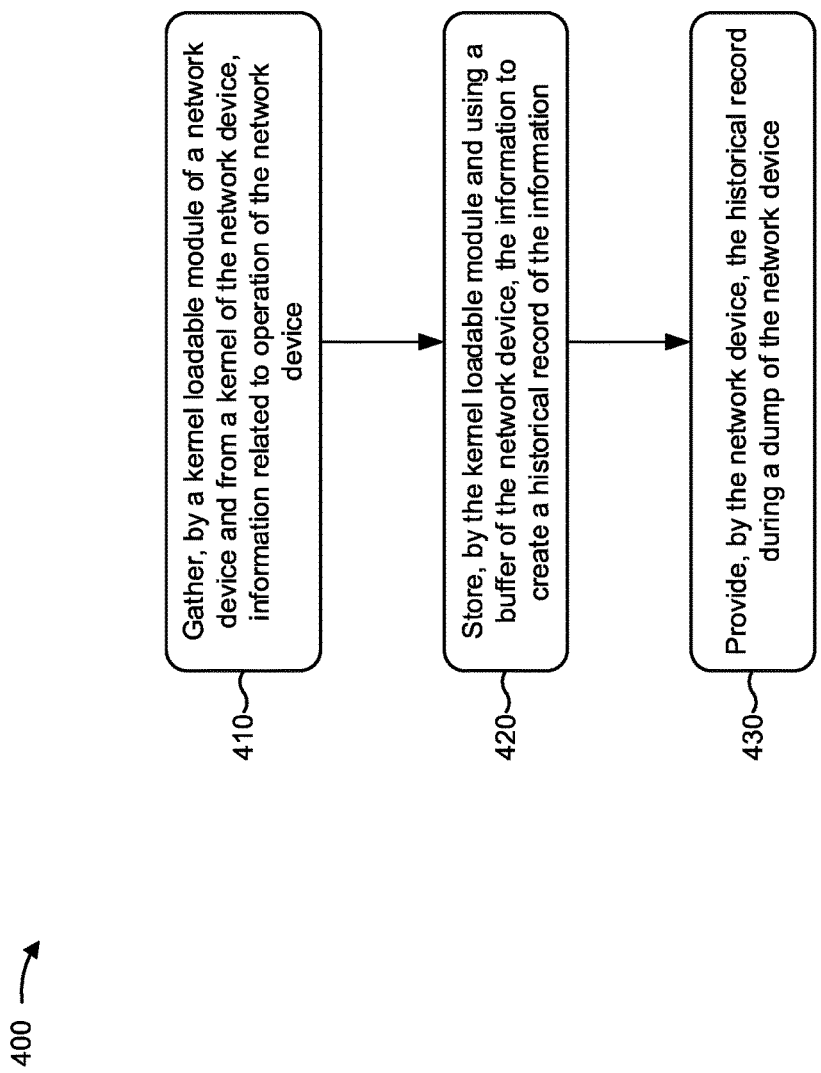

OBTAINING HISTORICAL INFORMATION IN A DEVICE CORE DUMP

BACKGROUND

In a computer system, a core dump consists of the recorded state of the memory of a computer system and/or program at a specific time, generally when the system and/or program has crashed or otherwise terminated abnormally. A core dump may also be referred to as a dump, memory dump, kdump, vmcore, or the like.

Core dumps are often used to assist in diagnosing and debugging errors in computer systems or programs. When a core dump is performed, working memory and other pieces of program state are usually dumped at the same time, including the processor registers, which may include a program counter and stack pointer, memory management information, and other processor and operating system flags and information.

SUMMARY

According to some possible implementations, a device may include one or more processors to gather, from a kernel of the device, information related to an operation of the device during each of a plurality of time intervals. The one or more processors may store, for each time interval of the plurality of time intervals, the information in a respective slot of a circular buffer that includes a plurality of slots. The circular buffer may be used to store a historical record of the information in one or more of the plurality of slots. The historical record may be provided from the circular buffer during a dump of the device. The one or more processors may provide the historical record during the dump of the device based on storing the historical record of the information in the one or more of the plurality of slots.

According to some possible implementations, a non-transitory computer-readable medium may store one or more instructions that, when executed by one or more processors, cause the one or more processors to receive information related to an operation of a device during each of a plurality of time intervals. The one or more instructions may cause the one or more processors to store, for each time interval of the plurality of time intervals, the information in a respective slot of a circular buffer that includes a plurality of slots. The circular buffer may be used to store a historical record of the information in one or more of the plurality of slots. The historical record may be provided from the circular buffer during a dump of the device. The one or more instructions may cause the one or more processors to provide the historical record during the dump of the device based on storing the historical record of the information in the one or more of the plurality of slots.

According to some possible implementations, a method may include receiving, by a device, information related to an operation of the device during each of a plurality of time intervals. The method may include storing, by the device and for each time interval of the plurality of time intervals, the information in a respective slot of a circular buffer that includes a plurality of slots. The circular buffer may be used to store a historical record of the information in the plurality of slots. The historical record may be provided from the circular buffer during a dump of the device. The method may include providing, by the device, the historical record during the dump of the device based on storing the historical record of the information in the plurality of slots.

BRIEF DESCRIPTION OF THE DRAWINGS

FIG. 4 is a flow chart of an example process for obtaining historical information in a core dump.

DETAILED DESCRIPTION

The following detailed description of example implementations refers to the accompanying drawings. The same reference numbers in different drawings may identify the same or similar elements.

When software of a network device experiences a crash (e.g., an unexpected or fatal error, a kernel panic, or another abnormal termination of the software), the network device may perform a core dump, which may include a snapshot of the memory of the network device at the time of the crash. The memory of the network device prior to the time of the crash, however, may not be recorded.

In addition, other techniques for debugging or diagnosing the crash may utilize syslogs or Simple Network Management Protocol (SNMP) data that was captured at the same time as the crash. Such other techniques may extract information at the time of the crash from logs, and may cross check the extracted information with the information provided in the core dump. Performing these functions may delay debugging and diagnosing the crash, consume additional processing resources, and/or the like.

Techniques using syslogs or SNMP data, as described above, may involve timestamps, and may require different timestamps to be synchronized. Synchronization of the timestamps may not be accurate (e.g., due to misaligned timestamps), and may require additional time/processing resources to perform and/or may delay debugging and/or diagnosing the crash. Further, in the event of a catastrophic crash, it may not even be possible to collect the logs from a different source such as syslog.

Implementations described herein provide a historical record of memory of a network device for a particular quantity of time periods prior to a crash of software of the network device. As an example, a core dump may be utilized to determine how much the system was loaded, prior to a crash, in terms of processor utilization. In this way, efficiency of debugging a software crash, and/or efficiency of diagnosing (e.g., identifying a source of) the crash, is improved, thereby conserving processing resources. In addition, accuracy of debugging and/or diagnosing a software crash is improved, thereby conserving processing resources that would otherwise be used to inaccurately debug or diagnose the crash. Further, implementations described herein enable processor utilization prior to a crash to be determined without requiring multiple logs and/or matching of timestamps, thereby providing improvements and conserving processing resources relative to other techniques used to obtain information related to a crash or failure of software.

Figure 1:
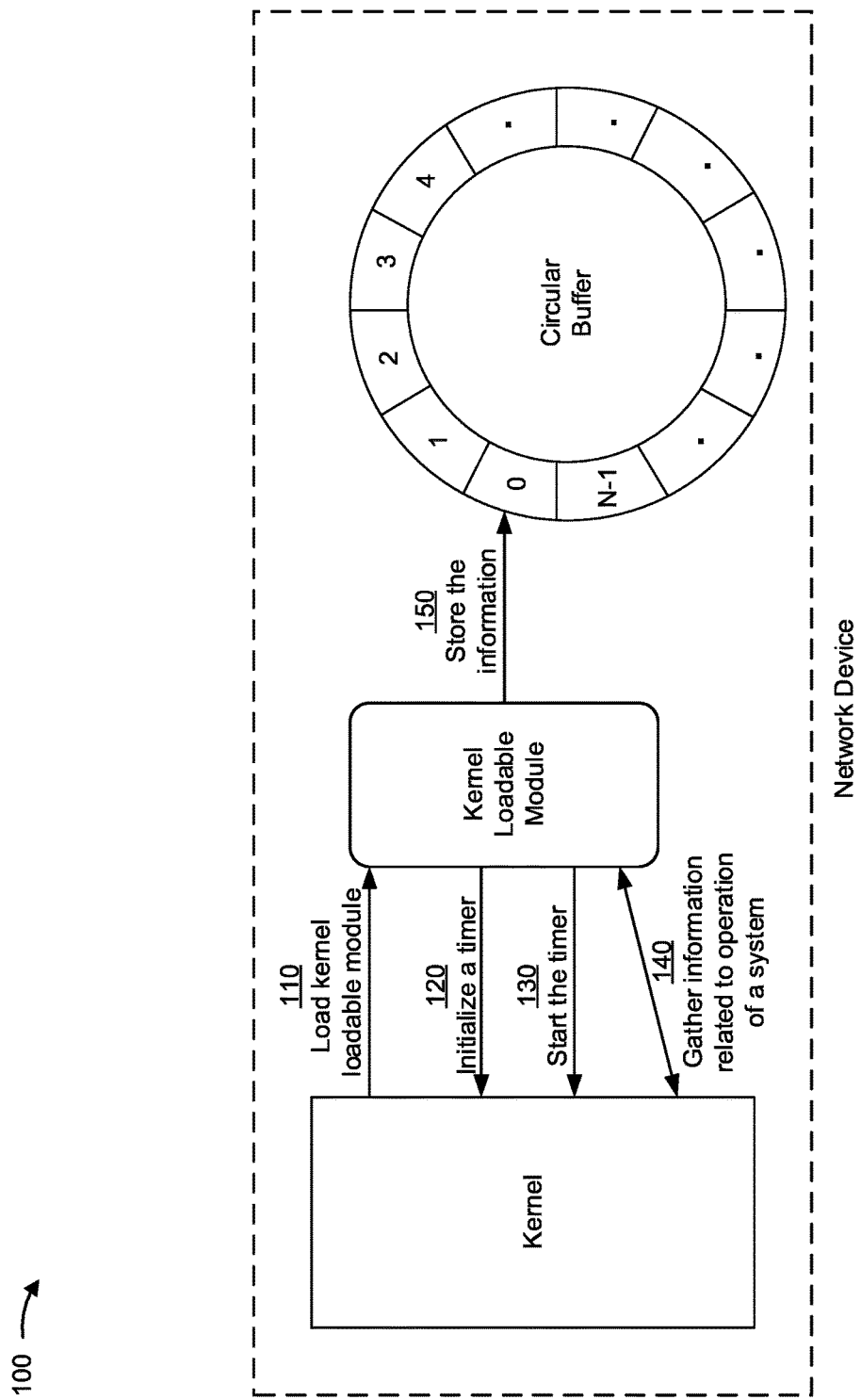
FIG. 1 is a diagram of an overview of an example implementation described herein.

FIG. 1 is a diagram of an overview of an example implementation 100 described herein. As shown in FIG. 1, example implementation 100 may include a network device, which may include a kernel, a kernel loadable module, and a circular buffer. As shown by reference number 110, the network device may load the kernel loadable module, such as upon powering on or booting up of the network device.

As shown by reference number 120, the network device may initialize a timer (e.g., the kernel loadable module may register a timer with the kernel). The timer may measure a time interval (e.g., a default amount of time, an amount of time designated by a network administrator, a time period, etc.). As shown by reference number 130, the network device may start the timer.

As shown by reference number 140, the network device may gather information related to operation of software. For example, the kernel loadable module may gather information related to operation of the network device. In some implementations, the information may identify an amount of processor utilization or other information related to the operation of the software of the network device. The network device may gather the information at the passage of each time interval described above.

As shown by reference number 150, the network device may store the gathered information. For example, the network device may store the information in a circular buffer having N slots (0 to N−1), as shown. The network device may store the information in each slot, progressing to a next slot each time information is gathered at each time interval as described above, and overwriting any data previously stored in the slot.

For example, the network device may store, in slot 0, information initially gathered in the time interval corresponding to slot 0; store, in slot 1, information gathered in the time interval corresponding to slot 1; store, in slot 2, information gathered in the time interval corresponding to slot 2; progressing until storing, in slot N−1, information gathered in the time interval corresponding to slot N−1. Thereafter, the network device may store information in slot 0 again, overwriting the information previously stored in slot 0, then store information in slot 1, overwriting the information previously gathered in slot 1, and so on. The kernel may dump the information stored in the circular buffer to a file when software of network device 210 crashes or otherwise experiences an error.

In this way, the network device maintains a historical record of the working memory of the network device for a quantity of N time periods prior to a crash of software of the network device. As a result, the network device improves debugging and/or diagnosing a software crash in terms of efficiency (thereby conserving processing resources) and accuracy (thereby conserving processing resources that would otherwise be used to inaccurately debug, or identify the source of, the crash).

As indicated above, FIG. 1 is provided merely as an example. Other examples are possible and may differ from what was described with regard to FIG. 1. For example, although FIG. 1 was described with respect to a network device, the implementations described herein may additionally apply to any type of computing and/or communication device.

Figure 2:
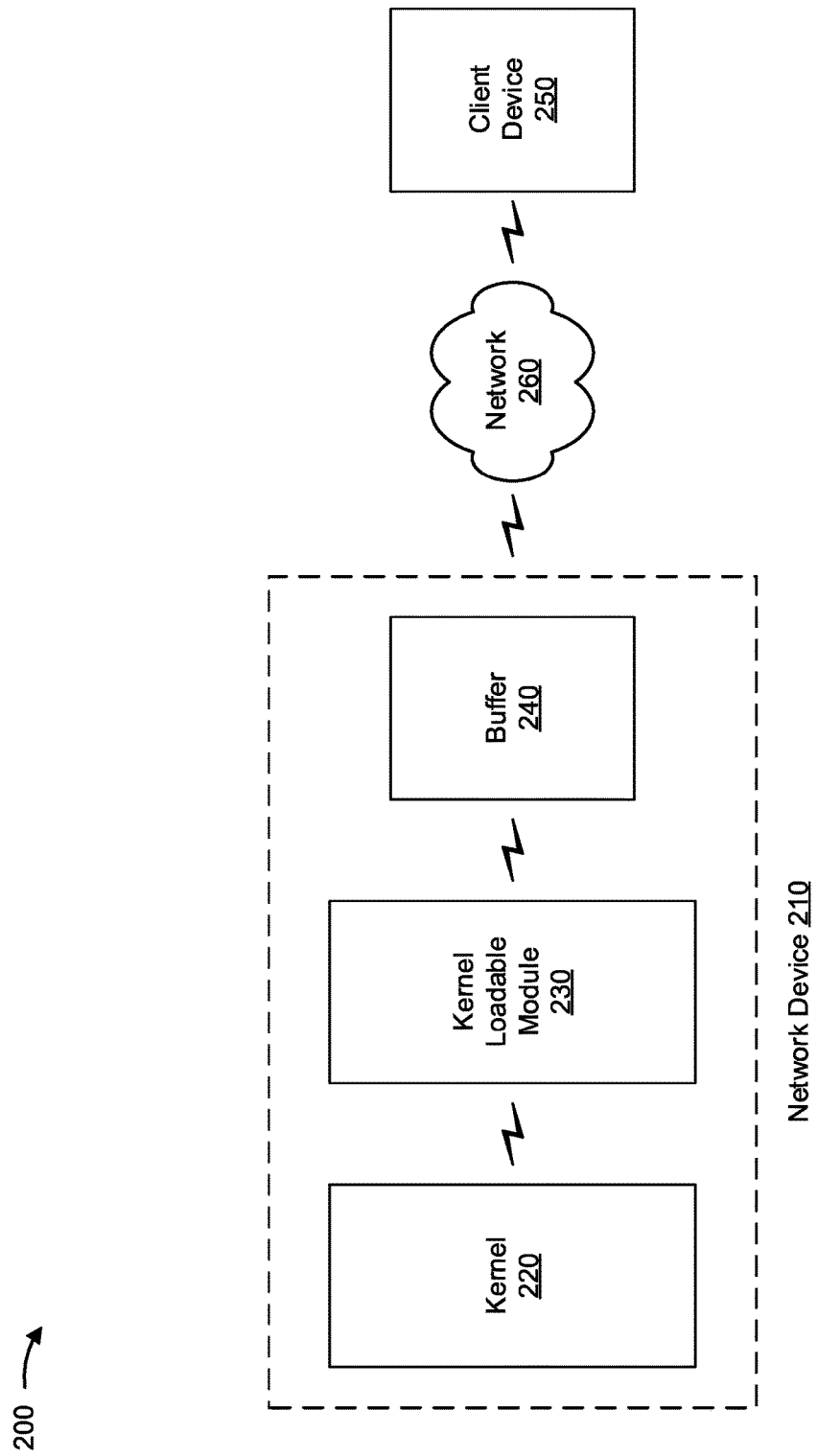
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network device 210, which includes a kernel 220, a kernel loadable module 230, and a buffer 240, a client device 250, and a network 260. Devices of environment 200 may interconnect via wired connections, wireless connections, or a combination of wired and wireless connections.

Network device 210 includes one or more devices capable of receiving, storing, generating, providing, and/or processing information, such as information related to operation of network device 210. For example, network device 210 may include a router, a firewall, a gateway, a switch, a hub, a bridge, a reverse proxy, a server (e.g., a proxy server), a security device, an intrusion detection device, a load balancer, or a similar type of device.

As shown in FIG. 2, network device 210 may include kernel 220, kernel loadable module 230, and buffer 240. In some implementations, kernel 220, kernel loadable module 230, and/or buffer 240 may be implemented in software executing on hardware, such as a processor. In some implementations, at least a portion of kernel 220, kernel loadable module 230, and/or buffer 240 may be implemented in hardware or firmware. In some implementations, network device 210 may use kernel loadable module 230 to gather information related to operation of network device 210 from kernel 220 and to store the information using buffer 240, as described elsewhere herein. Additionally, or alternatively, network device 210 may provide the contents of buffer 240 to a file during a core dump, as described elsewhere herein.

Kernel 220 includes one or more programs that constitute a central core of an operating system of a network device. For example, kernel 220 may include a monolithic kernel, a microkernel, a nanokernel, an exokernel, a hybrid kernel, a base kernel, an operating system, or a similar type of software element. In some implementations, kernel 220 may be the first program loaded upon startup of a network device, and may manage the remainder of the startup, such as by managing input/output requests from software, translating the requests into data processing instructions for a processor, managing memory, managing communications with other devices, such as another network device 210 or client device 250. In some implementations, kernel 220 may dynamically load kernel loadable module 230 (e.g., based on a configuration and/or setting of network device 210 and/or kernel 220), as described elsewhere herein. Additionally, or alternatively, kernel 220 may provide information related to operation of network device 210 and/or kernel 220 to kernel loadable module 230, as described elsewhere herein.

Kernel loadable module 230 includes one or more object files that contain code to extend the operation of a kernel of an operating system (e.g., kernel 220). For example, kernel loadable module 230 may include a kernel extension, a kernel extension module, a kernel-mode driver, a downloadable kernel module, and/or a similar type of software element. In some implementations, kernel loadable module 230 may be used to add support for hardware (e.g., as device drivers) or filesystems, and/or for adding system calls that can request a service from kernel 220. In some implementations, kernel loadable module 230 may request information related to operation of network device 210 and/or kernel 220 (e.g., via use of a system call), as described elsewhere herein. Additionally, or alternatively, kernel loadable module 230 may store the information in a buffer (e.g., buffer 240), as described elsewhere herein.

Buffer 240 includes one or more regions of memory storage (e.g., physical memory storage) to store data, such as temporary data relating to operation of software of network device 210. For example, buffer 240 may include a data buffer, a circular buffer (e.g., a data structure that uses a fixed-size buffer as if the buffer were connected end-to-end), a memory buffer, an optical buffer, a disk buffer, a variable length buffer, or a similar type of element. In some implementations, buffer 240 may receive and store information related to operation of network device 210 and/or kernel 220 from kernel loadable module 230, as described elsewhere herein. Additionally, or alternatively, the contents of buffer 240 may be sent to a file during a core dump (e.g., to permit analysis of the contents of buffer 240), as described elsewhere herein.

Client device 250 includes one or more devices capable of receiving, generating, storing, processing, and/or providing information associated with operation of network device 210. For example, client device 250 may include a communication and/or computing device, such as a desktop computer, a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, client device 250 may provide a set of instructions to network device 210 to use kernel loadable module 230 to gather information related to operation of network device 210, as described elsewhere herein. Additionally, or alternatively, client device 250 may receive a file that contains the information related to operation of network device 210 (e.g., during a core dump of network device 210), as described elsewhere herein.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of advanced generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
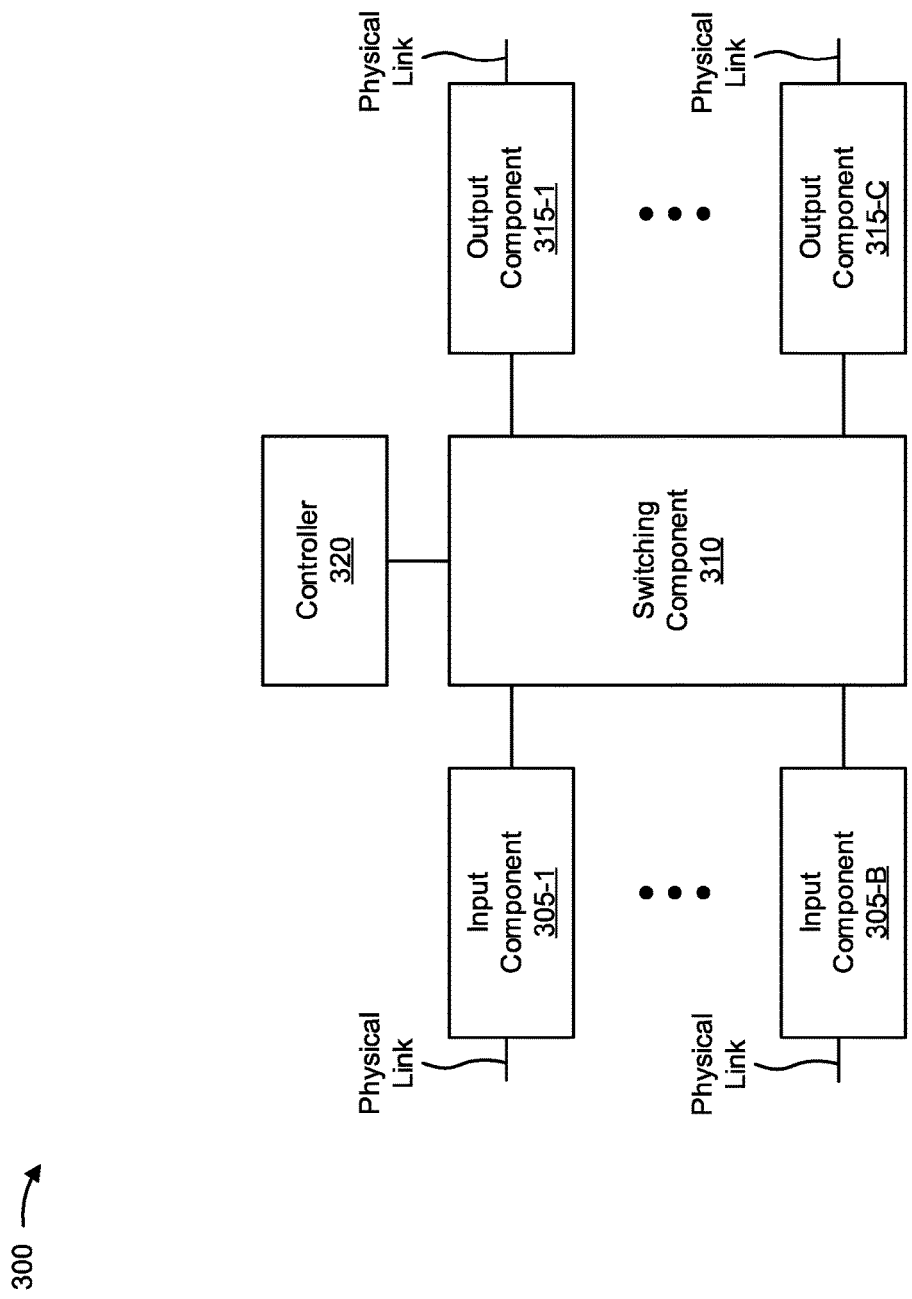
FIG. 3 is a diagram of example components of one or more devices of FIG. 2.

FIG. 3 is a diagram of example components of a device 300. Device 300 may correspond to network device 210 and/or client device 250. In some implementations, network device 210 and/or client device 250 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for obtaining historical information in a core dump. In some implementations, one or more process blocks of FIG. 4 may be performed by one or more elements of network device 210, such as kernel 220, kernel loadable module 230, and/or buffer 240.

As shown in FIG. 4, process 400 may include gathering, by a kernel loadable module of a network device and from a kernel of the network device, information related to operation of the network device (block 410). For example, network device 210 may gather information related to operation of network device 210 from kernel 220 using kernel loadable module 230. In some implementations, network device 210 may gather, from kernel 220 of network device 210, information related to an operation of network device 210 during each of a plurality of time intervals, as described herein.

In some implementations, the information gathered and stored may include information related to operation of network device 210 or a portion of network device 210, such as input component 305, switching component 310, output component 315, and/or controller 320. For example, the information may include information related to processor utilization, load (e.g., a percentage or amount of load, whether an amount of load satisfies a threshold, an amount of time an operating system had a particular amount of load, etc.), a type of communication interface being used by network device 210, a quantity of processes being created by software at a particular time, a timestamp related to the information, and/or another aspect of operation of network device 210 or a portion of network device 210.

In some implementations, network device 210 may load kernel loadable module 230. In some implementations, kernel 220 of network device 210 may load kernel loadable module 230 upon network device 210 (or a portion of network device 210) powering on or booting up. Additionally, or alternatively, kernel loadable module 230 may be configured such that kernel loadable module 230 can be selectively loaded (e.g., may be loaded or not loaded based on a setting or configuration of network device 210).

In some implementations, network device 210 may initiate a timer. In some implementations, kernel loadable module 230 of network device 210 may register the timer with kernel 220 and/or initiate the timer. In some implementations, the timer may measure a time interval of a particular length (e.g., measured in terms of minutes, seconds, milliseconds, or the like). In this case, the time interval may include a default amount of time (configured at manufacture or configuration of network device 210), may be configured by a network administrator, and/or the like.

In some implementations, network device 210 may perform an action based on the timer. For example, network device 210 may perform an action each time the timer measures a particular amount of time. In some implementations, network device 210 may gather information based on the timer, such as at every passage of the time interval, passage of every other time interval, and/or the like. For example, kernel loadable module 230 may gather the information related to operation of network device 210 (e.g., by calling a routine to gather the information) based on the timer. In this way, network device 210 may periodically, or according to a schedule, obtain information related to operation of network device 210, thereby improving gathering of information and subsequent debugging of a crash.

In this way, network device 210 may gather information related to operation of network device 210.

As further shown in FIG. 4, process 400 may include storing, by the kernel loadable module and using a buffer of the network device, the information to create a historical record of the information (block 420). For example, network device 210 may store the information in buffer 240 using kernel loadable module 230. In some implementations, network device 210 may store, for each time interval of a plurality of time intervals, the information in a respective slot of buffer 240 (e.g., a circular buffer) that includes a plurality of slots, where buffer 240 may be used to store a historical record of the information in one or more of the plurality of slots, and where the historical record is to be provided from buffer 240 during a dump of network device 210, as described herein. In some implementations, the information may be stored in a manner that creates a historical record of the information for a particular amount of time or a particular time period.

In some implementations, network device 210 may store the information (e.g., after gathering the information). For example, kernel loadable module 230 may store the information in a circular buffer. In this case, the circular buffer may include a quantity of slots for storing information (e.g., a quantity of N slots). In some implementations, network device 210 may store the information in each of the slots until the Nth slot is reached, in which case network device 210 may overwrite the information stored in the first slot of the circular buffer.

As a particular example, assume that the circular buffer includes N slots from slot 0 to slot N−1. In this case, network device 210 may start by storing information for a first time interval in slot 0 and then advance the index from slot 0 to slot 1. This pattern may continue until information is stored in slot N−1, at which point network device 210 may overwrite the information in slot 0 at the next time interval. In this way, network device 210 may maintain recent information related to operation of network device 210, thereby conserving memory resources of network device 210 and processing resources used to debug a software crash of network device 210.

In some implementations, each slot of buffer 240 may correspond to a particular point in time (e.g., prior to a software crash of network device 210). For example, a first slot of a circular buffer may correspond to a first point in time, a second slot may correspond to a second point in time, and so forth. In this way, the information stored in buffer 240 may create a historical record of the information related to the operation of network device 210 by simultaneously storing information for different points in time.

In some implementations, network device 210 may store the information using multiple buffers 240. For example, network device 210 may store the information using multiple circular buffers. In some implementations, when using multiple buffers 240, network device 210 may store the information using a first buffer 240 in a manner similar to that described above (e.g., where each slot of buffer 240 corresponds to a particular point in time).

In some implementations, when network device 210 has stored information in slot N−1 of the first buffer 240, network device 210 may provide the contents of the first buffer 240 to slot 0 of a second buffer 240 (e.g., rather than overwriting the information stored in slot 0 of the first buffer 240). In some implementations, when network device 210 again stores the information in slot N−1 of the first buffer 240, network device 210 may store the contents of the first buffer 240 in slot 1 of the second buffer 240.

In some implementations, network device 210 may continue to store information using the first buffer 240 and the second buffer 240 in a similar manner until network device 210 stores the contents of the first buffer 240 in slot N−1 of the second buffer 240. In some implementations, when network device 210 stores the contents of the first buffer 240 in slot N−1 of the second buffer 240, network device 210 may overwrite slot 0 of the second buffer 240 with the contents of the first buffer 240 at the next point time indicated by a timer.

In this way, network device 210 may store information related to operation of network device 210 to create a historical record of the information.

As further shown in FIG. 4, process 400 may include providing, by the network device, the historical record during a dump of the network device (block 430). For example, network device 210 may provide the historical record of the information, in association with the recorded state of the memory of network device 210, during a core dump of network device 210. In some implementations, network device 210 may provide the historical record during the dump of network device 210 based on storing the historical record of the information in the one or more of the plurality of slots, as described herein.

In some implementations, network device 210 may perform a dump (e.g., a core dump or a memory dump). For example, network device 210 may perform a core dump, including the contents of buffer 240, based on a software crash, based on input from a network administrator to perform the core dump, based on receiving an instruction from another device (e.g., client device 250) to perform the core dump, and/or the like.

Additionally, or alternatively, network device 210 may generate a file to store the information stored in the buffer (e.g., in association with performing the core dump). In this case, network device 210 may send the file to another device (e.g., client device 250, such as to permit analysis of the information related to the operation of network device 210). Additionally, or alternatively, network device 210 may provide information for display that includes the information related to the operation of network device 210 (e.g., information stored in buffer 240). This improves debugging by permitting the contents of buffer 240 to be obtained from network device 210 and analyzed.

In some implementations, network device 210 may perform an action other than providing the historical record. In some implementations, network device 210 may trigger an alarm or alert, such as based on software of network device 210 crashing, to be provided to a network administrator. In some implementations, the alarm or alert may include different characteristics based on a nature of network device 210, or based on other information related to the crash, the core dump, associated circumstances, or the like. For example, the alarm or alert may include information identifying particular software that crashed, information identifying a particular component of network device 210 that failed, information identifying network device 210, and/or the like. This conserves processing resources related to debugging the crash by enabling a device or a network administrator to quickly and efficiently identify a source or cause of the crash.

Additionally, or alternatively, network device 210 may send a message (e.g., an email or text message) to a network administrator, engineer, or manager. For example, network device 210 may provide the message based on software of network device 210 crashing. In some implementations, the message may include information related to the nature of network device 210, the crash, the core dump, associated circumstances, and/or the like. This conserves processing resources related to debugging the crash by enabling a device or a network administrator to quickly and efficiently identify a source or cause of the crash. In addition, this improves functioning of network device 210 by facilitating quick fixing of the cause of the crash.

Additionally, or alternatively, network device 210 may perform processing with regard to the information gathered and/or stored in buffer 240. For example, network device 210 may extract and analyze particular types of information stored in buffer 240. In some implementations, network device 210 may prioritize types of information extracted or analyzed (e.g., network device 210 may first analyze a type of information more likely to indicate a cause or factor in a software crash, and may thereafter analyze, if necessary, a type of information less likely to indicate a cause or factor). In some implementations, the likelihood may be determined using a data structure or other information indicating likelihoods. This improves an efficiency of fixing the cause of the crash, thereby conserving processing resources.

Additionally, or alternatively, network device 210 may prioritize information stored in different slots and/or analyze information stored in different slots in a particular order. For example, network device 210 may first analyze information in a slot most recently stored in buffer 240, and may thereafter analyze, if necessary, information stored in a slot one time interval earlier, information stored in a slot two time intervals earlier, and so on. This improves an efficiency of analyzing the cause of the crash, thereby conserving processing resources.

Additionally, or alternatively, network device 210 may compare information stored in different slots and may utilize a result of comparing the information in debugging and/or diagnosing a software crash. Additionally, or alternatively, network device 210 may compare a particular type of information extracted from one slot to a same type of information extracted from another slot, and may utilize a result of comparing the same type of information from different slots in debugging and/or diagnosing a software crash. This improves an efficiency of fixing the cause of the crash, thereby conserving processing resources.

Additionally, or alternatively, network device 210 may train a model using data from various dumps and/or information related to known causes of dumps/software crashes. For example, network device 210 may train a model using data from a previous dump (e.g., a buffer 240 dump or a dump of a slot of buffer 240) of network device 210, another network device 210, a different type of device than network device 210, and/or the like. In some implementations, when network device 210 experiences a software crash, network device 210 may use the model to identify a cause of the dump based on data from the dump of network device 210. For example, using the model may identify a likely cause of the dump, multiple possible causes of the dump with corresponding probabilities of being the actual cause of the dump, and/or the like.

Additionally, or alternatively, network device 210 may determine whether the information stored in buffer 240 satisfies a threshold (e.g., a threshold processor utilization). In some implementations, network device 210 may perform an action when the information satisfies a threshold. In some implementations, the action may include generating a report that identifies the information stored in buffer 240. Additionally, or alternatively, the action may include providing the information stored in buffer 240 to another device (e.g., client device 250). Additionally, or alternatively, the action may include providing a message to client device 250 or a network administrator that indicates that the information satisfies the threshold. Additionally, or alternatively, network device 210 may generate a work order based on the information satisfying a threshold. Additionally, or alternatively, network device 210 may cause network device 210, or a component of network device 210, to power off, reboot, update software, and/or the like (e.g., based on information dumped from buffer 240). This improves maintenance of network device 210 by performing an action when the information related to the operation of the device satisfies a threshold (e.g., before software crashes, such as to prevent the software from crashing).

In some implementations, block 430 may include block 420. In other words, performing the action may include storing the information using buffer 240.

In this way, network device 210 may provide the historical record during a dump of network device 210 and/or may perform an action other than providing the historical record.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein provide a historical record of the working memory of a network device for a particular quantity of time periods prior to a crash of software of the network device. As an example, a core dump may be utilized to determine how much the software was loaded, prior to a crash, in terms of processor utilization. In this way, efficiency of debugging and/or diagnosing a software crash is improved, thereby conserving processing resources. In addition, accuracy of debugging and/or diagnosing a software crash is improved, thereby conserving processing resources that would otherwise be used to inaccurately debug the crash or inaccurately diagnose the crash. Further, implementations described herein enable processor utilization prior to a crash to be determined without requiring multiple logs and/or matching of timestamps, thereby providing improvements and conserving processing resources relative to other techniques used to obtain information related to a crash or failure of software.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories, and
   one or more processors, communicatively coupled to the one or more memories, to:
     gather, from a kernel of the device, information related to an operation of the device during each of a plurality of time intervals;
     store, for each time interval of the plurality of time intervals, the information in a respective slot of a circular buffer that includes a plurality of slots,
       the circular buffer being used to store a historical record of the information in at least two slots of the plurality of slots,
       the historical record to be provided from the circular buffer during a dump of the device;
     compare first information stored in a first slot of the at least two slots and second information stored in a second slot of the at least two slots;

obtain, based on comparing the first information and the second information, result data for diagnosing or debugging the dump of the device; and provide the result data and the historical record during the dump of the device based on storing the historical record of the information in the at least two slots of the plurality of slots.

2. The device of claim 1, where the one or more processors are further to:

use the kernel to load a kernel loadable module of the device; and use the kernel loadable module to track the plurality of time intervals and store, for each time interval of the plurality of time intervals, the information in the respective slot of the circular buffer.

3. The device of claim 1, where the one or more processors are further to:

receive a request to provide the historical record to another device; and where the one or more processors, when providing the historical record, are to:

provide the historical record to the other device based on receiving the request to provide the historical record.

4. The device of claim 1, where the one or more processors, when gathering the information, are to:

gather the first information during a first time interval of the plurality of time intervals;

gather the second information during a second time interval of the plurality of time intervals; and where the one or more processors, when storing the information, are to:

store the first information in the first slot, and store the second information in the second slot.

5. The device of claim 1, where the historical record simultaneously includes the information for at least two different time intervals of the plurality of time intervals.

6. The device of claim 1, where the information relates to processor utilization of the device.

7. The device of claim 1, where the one or more processors are further to:

determine a timestamp for the information based on gathering the information; and where the one or more processors, when storing the information, are to:

store the timestamp with the information using the circular buffer based on determining the timestamp.

8. A non-transitory computer-readable medium storing instructions, the instructions comprising:

one or more instructions that, when executed by one or more processors, cause the one or more processors to:

receive information related to an operation of a device during each of a plurality of time intervals;

store, for each time interval of the plurality of time intervals, the information in a respective slot of a circular buffer that includes a plurality of slots, the circular buffer being used to store a historical record of the information in at least two slots of the plurality of slots, the historical record to be provided from the circular buffer during a dump of the device;

compare first information stored in a first slot of the at least two slots with second information stored in a second slot of the at least two slots;

obtain, based on comparing the first information and the second information, result data for diagnosing or debugging the dump of the device; and provide the result data and the historical record during the dump of the device based on storing the historical record of the information in the at least two of the plurality of slots.

9. The non-transitory computer-readable medium of claim 8, where the one or more instructions, when executed by the one or more processors, further cause the one or more processors to:

detect a software error during the operation of the device; and where the one or more instructions, that cause the one or more processors to provide the historical record, cause the one or more processors to:

provide the historical record to a file based on detecting the software error.

10. The non-transitory computer-readable medium of claim 8, where the one or more instructions, that cause the one or more processors to receive the information, cause the one or more processors to:

receive the information from a kernel, of the device, that collects or detects the information.

11. The non-transitory computer-readable medium of claim 8, where the one or more instructions, when executed by the one or more processors, further cause the one or more processors to:

load a kernel loadable module upon the device powering on or booting up;

initialize, by the kernel loadable module, a timer based on loading the kernel loadable module, the timer to identify a time interval of the plurality of time intervals;

start the timer to cause the timer to identify the time interval; and where the one or more instructions, that cause the one or more processors to receive the information, further cause the one or more processors to:

receive the information from a kernel of the device based on the timer identifying the time interval.

12. The non-transitory computer-readable medium of claim 8, where the historical record includes the information for a particular quantity of the plurality of time intervals prior to a software error of the device.

13. The non-transitory computer-readable medium of claim 8, where the one or more instructions, that cause the one or more processors to store the information, cause the one or more processors to:

store the first information in the first slot, the first slot being associated with a first time interval of the plurality of time intervals; and store the second information in the second slot, the second slot being associated with a second time interval of the plurality of time intervals, the first time interval occurring prior to the second time interval; and where the one or more instructions, that cause the one or more processors to provide the historical record, cause the one or more processors to:

provide the historical record based on storing the first information and the second information, the historical record including the first information and the second information.

14. The non-transitory computer-readable medium of claim 8, where the one or more instructions, when executed by the one or more processors, further cause the one or more processors to:

provide the historical record to another device based on storing the information, or generate a report related to the historical record based on storing the information.

15. A method, comprising:

receiving, by a device, information related to an operation of the device during each of a plurality of time intervals;

storing, by the device and for each time interval of the plurality of time intervals, the information in a respective slot of a circular buffer that includes a plurality of slots, the circular buffer being used to store a historical record of the information in at least two slots of the plurality of slots, the historical record to be provided from the circular buffer during a dump of the device;

comparing, by the device, first information stored in a first slot of the at least two slots with second information stored in a second slot of the at least two slots;

obtaining, by the device and based on comparing the first information and the second information, result data for diagnosing or debugging the dump of the device; and providing, by the device, the result data and the historical record during the dump of the device based on storing the historical record of the information in the at least two slots.

16. The method of claim 15, where the plurality of slots corresponds to a particular amount of time prior to the dump of the device.

17. The method of claim 15, further comprising:

determining a timestamp for the information when storing the information; and where providing the historical record comprises:

providing the historical record with the timestamp based on determining the timestamp.

18. The method of claim 15, further comprising:

determining whether the information satisfies a threshold; and where providing the historical record comprises:

providing the historical record based on determining whether the information satisfies the threshold.

19. The method of claim 15, where receiving the information comprises:

receiving the information from a kernel, of the device, that collects or determines the information.

20. The method of claim 15, further comprising:

loading a kernel loadable module prior to receiving the information; and where receiving the information comprises:

receiving the information using the kernel loadable module based on loading the kernel loadable module.

\* \* \* \* \*